United States Patent [19]

Glore

[11] Patent Number: 4,498,682
[45] Date of Patent: Feb. 12, 1985

[54] FREE FLOATING ACTUATING SLEEVE FOR KEYLESS CHUCK

[75] Inventor: Thomas G. Glore, Easley, S.C.

[73] Assignee: The Singer Company, Stamford, Conn.

[21] Appl. No.: 442,408

[22] Filed: Nov. 17, 1982

[51] Int. Cl.³ .............................................. B23B 31/10
[52] U.S. Cl. ..................................... 279/1 K; 279/60; 279/61
[58] Field of Search ............................ 279/1 K, 60–65, 279/1 B

[56] References Cited

U.S. PATENT DOCUMENTS

| | | | |
|---|---|---|---|
| 3,506,277 | 4/1970 | Harms | 279/63 |
| 3,599,996 | 8/1971 | Holt | 279/1 B |
| 3,734,517 | 5/1973 | Benjamin | 279/1 B |
| 3,947,047 | 3/1976 | Hultman | 279/1 B |
| 4,032,163 | 6/1977 | Holt | 279/1 B |
| 4,154,450 | 5/1979 | Derbyshire | 279/60 |
| 4,174,113 | 11/1979 | Eckman | 279/1 B X |
| 4,234,277 | 11/1980 | Benson et al. | 279/1 B X |
| 4,277,074 | 7/1981 | Kilberis | 279/60 |
| 4,317,578 | 3/1982 | Welch | 279/62 X |
| 4,323,324 | 4/1982 | Eberhardt | 279/62 |
| 4,345,445 | 8/1982 | Warthen | 279/62 |
| 4,395,170 | 7/1983 | Clarey | 279/62 |
| 4,460,296 | 7/1984 | Sivertson, Jr. | 279/1 K |

FOREIGN PATENT DOCUMENTS 2041798  9/1980  United Kingdom ............... 279/1 K

*Primary Examiner*—William R. Briggs
*Attorney, Agent, or Firm*—Edward P. Schmidt; Robert E. Smith; Edward L. Bell

[57] ABSTRACT

A compact keyless chuck having means therein for isolating inasmuch as possible, impact and abrasion on an operator's hand normally encountered when the chuck jaws bottom, for example, about a rotatable work tool. A free floating sleeve, rotatable and slidable with respect to the chuck encircles the same and is provided with a surface thereon for implementing actuation of the tightening or loosening of the rotatable work tool upon motorized operation of the machine spindle.

3 Claims, 2 Drawing Figures

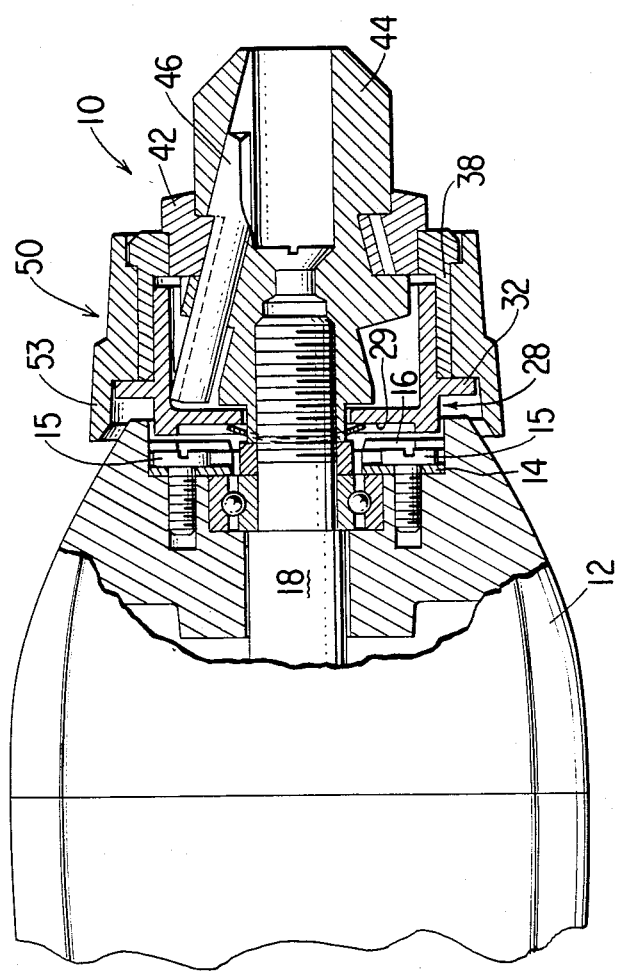
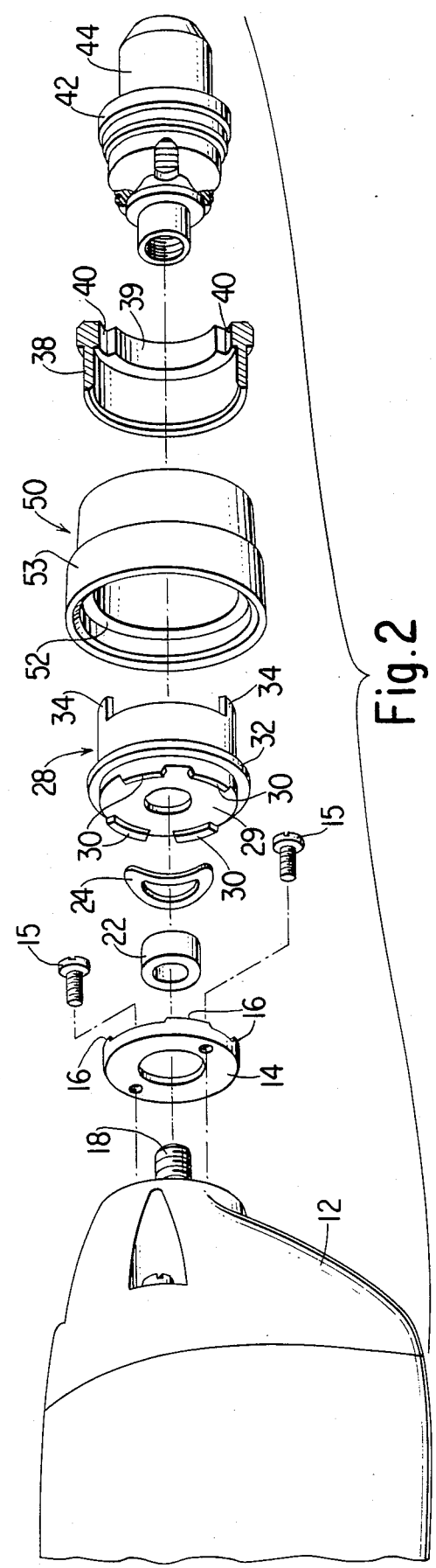

FREE FLOATING ACTUATING SLEEVE FOR KEYLESS CHUCK

BACKGROUND OF THE INVENTION

This invention relates to an apparatus for tightening and loosening jaws of a chuck; more particularly, it relates to a device for easing impact and abrasion on an operator's hand in such an apparatus when the chuck is tightened or loosened about a work tool by motorized operation of the machine spindle.

There are, in the prior art, many examples of keyless chucks. For example, there is U.S. patent application Ser. No. 179,359, filed Aug. 18, 1980 by Clary. There are also U.S. Pat. Nos. 4,277,074 of Kilberis, 3,506,277 of Harms, and 2,684,856 of Stoner. The above and other prior art exhibit one undesirable characteristic which is avoided in the instant invention. All the prior art devices provide for an operator's grasping of a collar and sliding the same to bring about an engagement between stationary and rotating teeth, which teeth induce a motion of the sleeve when the chuck locks about the work tool, which motion may tear and abrade an operator's hand. What is required is an arrangement which protects an operator's hand from the tearing and abrading motion normally encountered. Ideally, this arrangement must be extremely compact so as not to appreciably enlarge the chuck and must be capable of economical manufacture.

SUMMARY OF THE INVENTION

The above desired ends are achieved in a power tool having a fixed washer-like clutch affixed to the power tool about the output spindle shaft thereof, the fixed clutch having outwardly facing tapered teeth. A clutch-driver is supported about the spindle shaft and is formed with tapered teeth directed towards the tapered teeth of the fixed clutch but separated therefrom by an intervening thrust washer and spring washer. The clutch-driver is slidably keyed to the inside diameter of one end of a collar, the other end of which may be a press fit on a traverse nut which engage with threaded portions of chuck jaws retained in a chuck body. The depth of engagement of the clutch-driver with the collar is limited by a flange extending therefrom which engages the bottom of the collar. Situated about the outside of the collar and bearing against the flange of the clutch-driver is a sleeve which may freely rotate or translate on the collar. The sleeve may be used to shift the clutch-driver against the urgings of the spring washer so as to engage the teeth of the clutch-driver with those of the fixed clutch. Rotation of the traverse nut, and the collar affixed thereto, is transmitted to the clutch-driver by way of key ways on the collar which are engaged by circumferential key extensions of the clutch-driver. When the sleeve is shifted to bring the teeth of the clutch-driver into engagement with the teeth of the fixed clutch, the traverse nut is prevented from rotation until the chuck jaws, which are moved by the traverse nut, engage a work tool, or are back seated by reverse rotation of the spindle shaft. Thereupon, in either case, the rotation of the spindle shaft and chuck body are transferred through the threads of the chuck jaws to the traverse nut, collar and clutch-driver. Accordingly, the tapered teeth of the clutch-driver rotating against the tapered teeth of the fixed clutch create a repeated separation of engagement of the clutch-driver with the fixed clutch. This motion is felt in the sleeve as a translational motion primarily, with only that rotational motion attributal to the coefficient of friction between the sleeve and the clutch-driver. By insuring a suitable low friction between the sleeve and clutch-driver, the tearing and abrading force felt by the hand of an operator are substantially alleviated or eliminated. Further, by reducing the height of the tapered teeth the translatory motion imposed upon the hand of an operator may be reduced to a minimum.

BRIEF DESCRIPTION OF THE DRAWINGS

In order that the invention may be more fully understood, it will be described by way of example with reference to the accompanying drawings in which:

FIG. 1 is a cross sectional view of a keyless chuck incorporating the invention and supported on a power tool; and, FIG. 2 is an exploded perspective, partly in section, of the keyless chuck shown in FIG. 1.

Referring to FIG. 1, a keyless chuck 10 incorporating the invention, is shown in cross section attached to a motorized power tool 12 which may be, by way of example, a commonly known powered hand drill carrying a motor and transmission within the frame thereof. The keyless chuck 10 includes a circular non-rotating or fixed clutch 14 in the form of an annulus fixed to the frame of the power drill 12 about the spindle shaft 18 thereof by, for example, screws 15. The fixed clutch 14 includes axially extending circumferentially spaced teeth 16 having flat lands and tapered transition zones.

A spacer washer 22 sits about the spindle shaft 18 in the hollow central portion of the fixed clutch. A spring washer 24 encircles the spindle shaft 18 and engages the spacer washer 22. The spring washer 24 also engages face 29 of clutch-driver 28 and normally maintains a separation between the clutch-driver and fixed clutch 14.

The clutch-driver 28 is further formed with axially extending and circumferentially spaced teeth 30 facing towards the fixed clutch 14 and also having flat lands and tapered transition zones which are complemental to the transition zones of the fixed clutch. The clutch-driver 28 further includes a flange 32 extending from the circular body of the clutch-driver and spaced from the face 29 thereof. On the end opposite the tapered teeth 30 of the clutch-driver 28, there are formed circumferentially spaced and axially extending keys 34. The clutch-driver 28 is slidable internally of a collar 38 which is partially broken away in FIG. 2 to disclose a reduced internal diameter portion 39 having axially aligned key ways 40 therethrough for receiving the keys 34 formed on the end of the clutch-driver. Thus, the clutch-driver 28 is free to translate with respect to collar 38, but may not partake of independent rotational motion with respect thereto. In the usual fashion, the collar 38 is a press fit on a split traverse nut 42 and retains the split nut assembled rotatably about a chuck body 44 and chuck jaws 46 which are externally threaded to mesh with internal threads on the traverse nut as is well known in the art. The chuck body 44 is attachable to the spindle shaft 18 by any means such as a threaded connection between external threads on the spindle shaft and internal threads formed on the chuck body.

A sleeve 50 is provided encircling the collar 38. The sleeve 50 is fashioned with an annular land 52 engaging the flange 32 of the clutch-driver 28. An extension 53 to the sleeve 50 beyond the annular land 52 provided further insurance that an operator grasping the sleeve would be isolated from any contacts with other moving parts of the chuck assembly 10.

In operation, the sleeve 50 will rotate with the chuck and due to the frictional contact between the sleeve and the collar 38. The frictional contact between these two members may be made very low by providing for a fine finish on the external surface of the collar 38 and on the internal surface of the sleeve 50. Since the frictional force is a function of the weight of the sleeve 50, the frictional force may be further reduced by use of a plastic material, which material would also provide a lower coefficient of friction. Thus, when the chuck assembly 10 is rotating under the urgings of the motor driven spindle shaft 18, a light grasp by an operator of the sleeve 50 will serve to stop rotation thereof. If the sleeve 50 is translated with respect to the chuck body 44 so as to urge the tapered teeth 30 of the clutch-driver 28 into engagement with the tapered teeth 16 of the fixed clutch 14, extension or retraction of the chuck jaws 46 will be implemented according to the direction of rotation of the spindle shaft 18. When the chuck jaws 46 bottom against the work tool, or the traverse nut 42, the tapered transition zones on the teeth 16, 30 will urge the clutch-driver 28 away from the fixed clutch 14, causing a short translation motion of the sleeve 50. The translational motion may be substantially reduced by providing a low profile or height of the teeth 16, 30 of the fixed clutch 14 and clutch-driver 28, respectively. Such a short motion of the sleeve 50 may be readily accommodated to by an operator. Because the coefficient of friction between the sleeve 50 and the flange 32 of the clutch-driver 28 is very low by reason of the fine finish on the mating parts and the low coefficient of friction of the plastic material of the sleeve, and because the height of the teeth 16, 30 may be made low, the tearing and abrading motion normally found in devices of this sort is eliminated or, to a large extent, alleviated.

A number of alternative constructions embodying the principles of this invention may occur to one skilled in the art. Such other constructions are deemed to be within the scope and spirit of this disclosure. It is to be understood that the preferred embodiment described herein is for purposes of illustration and is not to be construed as a limitation of this invention.

I claim:

1. A keyless chuck for a motorized tool having a body supporting a drivemotor, a spindle shaft rotatable by said drive motor, and a chuck supported for rotation on said spindle shaft, said chuck comprising:

a chuck body; chuck jaws retained for rotation with said chuck and constrained for sliding movement on said chuck body toward and away from the axis thereof; grip actuating means responsive to rotation of said chuck by selective manipulation by an operator for sliding said chuck jaws into and out of gripping relation about a rotatable work tool; said grip actuating means including an annular collar axially constrained and rotatable on said chuck body; and means threadedly interconnecting said collar and each of said chuck jaws;

the improvement rendering said chuck keyless comprising:

a sleeve freely slidable and rotatable about said chuck body and encircling said annular collar; and means cooperating with means on said body and rendered effective by operator influenced slidable motion of said sleeve for establishing effectiveness of said grip actuating means to slide said chuck jaws about a rotatable work tool in response to rotation of said chuck, whereby movement of said grip actuating means is isolated from said operator by said sleeve.

2. A keyless chuck as claimed in claim 1 wherein said grip actuating means further comprises a non-rotating clutch encircling said spindle shaft, said non-rotating clutch being formed with circumferentially spaced teeth extending therefrom parallel to said spindle shaft, said teeth being formed with at least one tapered side; a clutch-driver axially movable with respect to said spindle shaft, said clutch-driver being formed with circumferentially spaced teeth extending therefrom parallel to said spindle shaft, said teeth being complemental to said teeth on said non-rotating clutch and movable with said clutch-driver from a position out of engagement with said teeth of said non-rotating clutch to a position in engagement therewith; said threaded connection interconnecting said collar and each of said chuck jaws comprising outer threaded surfaces formed on said chuck jaws and internal threads formed on said collar engaged with said outer threaded surfaces of said chuck jaws; means for slidably connecting said clutch-driver to said collar for rotation therewith; and wherein said actuating means further comprises an internal annular land on said sleeve cooperable with an external flange on said clutch-driver for moving the same into engagement with said fixed clutch on slidable motion of said sleeve.

3. A keyless chuck as claimed in claim 2 wherein said sleeve is fashioned of a synthetic resin material of lightweight and low coefficient of friction, and wherein said teeth on said fixed clutch and said complemental teeth on said clutch-driver are of a low profile to obtain the least movement of said sleeve to obtain engagement of said teeth.

* * * * *